US 8,240,757 B2

(12) United States Patent
Niitsuma et al.

(10) Patent No.: US 8,240,757 B2
(45) Date of Patent: Aug. 14, 2012

(54) COUPLING MECHANISM FOR HEADREST OF VEHICLE SEAT

(75) Inventors: Kenichi Niitsuma, Tochigi-ken (JP); Hirooki Negishi, Tochigi-ken (JP); Jinichi Tanabe, Tochigi-ken (JP); Koji Sano, Saitama-ken (JP); Koji Uno, Saitama-ken (JP); Tatsuya Terauchi, Saitama-ken (JP); Tomoki Matsumoto, Saitama-ken (JP)

(73) Assignees: TS Tech Co., Ltd., Saitama (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/361,222

(22) Filed: Jan. 30, 2012

(65) Prior Publication Data
US 2012/0126594 A1 May 24, 2012

Related U.S. Application Data

(62) Division of application No. 13/077,325, filed on Mar. 31, 2011, now Pat. No. 8,104,831, which is a division of application No. 12/279,766, filed as application No. PCT/JP2005/013468 on Jul. 22, 2005, now Pat. No. 8,020,930.

(51) Int. Cl.
*B60N 2/42* (2006.01)
*B60N 2/427* (2006.01)
(52) U.S. Cl. .................................. 297/216.12
(58) Field of Classification Search ............. 297/216.12
See application file for complete search history.

(56) References Cited

U.S. PATENT DOCUMENTS

| 4,632,454 A | 12/1986 | Naert |
| 5,076,643 A | 12/1991 | Colasanti et al. |
| 6,139,102 A | 10/2000 | von Möller |
| 6,250,714 B1 | 6/2001 | Nakano et al. |
| 6,260,921 B1 | 7/2001 | Chu et al. |
| 6,375,262 B1 | 4/2002 | Watanabe |
| 6,568,753 B1 | 5/2003 | Watanabe |
| 6,702,377 B2 | 3/2004 | Nakano |
| 6,783,177 B1 | 8/2004 | Nakano |
| 6,789,845 B2 | 9/2004 | Farquhar et al. |
| 6,918,633 B2 | 7/2005 | Forkel et al. |
| 6,955,397 B1 | 10/2005 | Humer |
| 7,044,544 B2 | 5/2006 | Humer et al. |
| 7,052,087 B2 | 5/2006 | McMillen |
| 7,077,472 B2 | 7/2006 | Steffens, Jr. |
| 7,104,602 B2 | 9/2006 | Humer et al. |
| 7,270,374 B2 | 9/2007 | Moriggi |

(Continued)

FOREIGN PATENT DOCUMENTS

DE 100 46 391 C1 4/2002

(Continued)

*Primary Examiner* — Rodney B White
(74) *Attorney, Agent, or Firm* — Drinker Biddle & Reath LLP

(57) ABSTRACT

A vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

20 Claims, 6 Drawing Sheets

U.S. PATENT DOCUMENTS

| | | |
|---|---|---|
| 7,393,052 B2 | 7/2008 | Humer et al. |
| 7,644,987 B2 | 1/2010 | Humer et al. |
| 8,020,930 B2 * | 9/2011 | Niitsuma et al. ......... 297/216.12 |
| 8,104,831 B2 * | 1/2012 | Niitsuma et al. ......... 297/216.12 |
| 2004/0155496 A1 | 8/2004 | Farquhar et al. |
| 2006/0006709 A1 | 1/2006 | Uno et al. |
| 2009/0001785 A1 | 1/2009 | Swan et al. |

FOREIGN PATENT DOCUMENTS

| | | |
|---|---|---|
| DE | 102 12 828 C1 | 6/2003 |
| JP | 7-75608 A | 3/1995 |
| JP | 10-119619 A | 5/1998 |
| JP | 10-138811 A | 5/1998 |
| JP | 10-138812 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2000-211410 A | 8/2000 |
| JP | 2003-341401 A | 12/2003 |

* cited by examiner

FIG. 5
FIG. 6
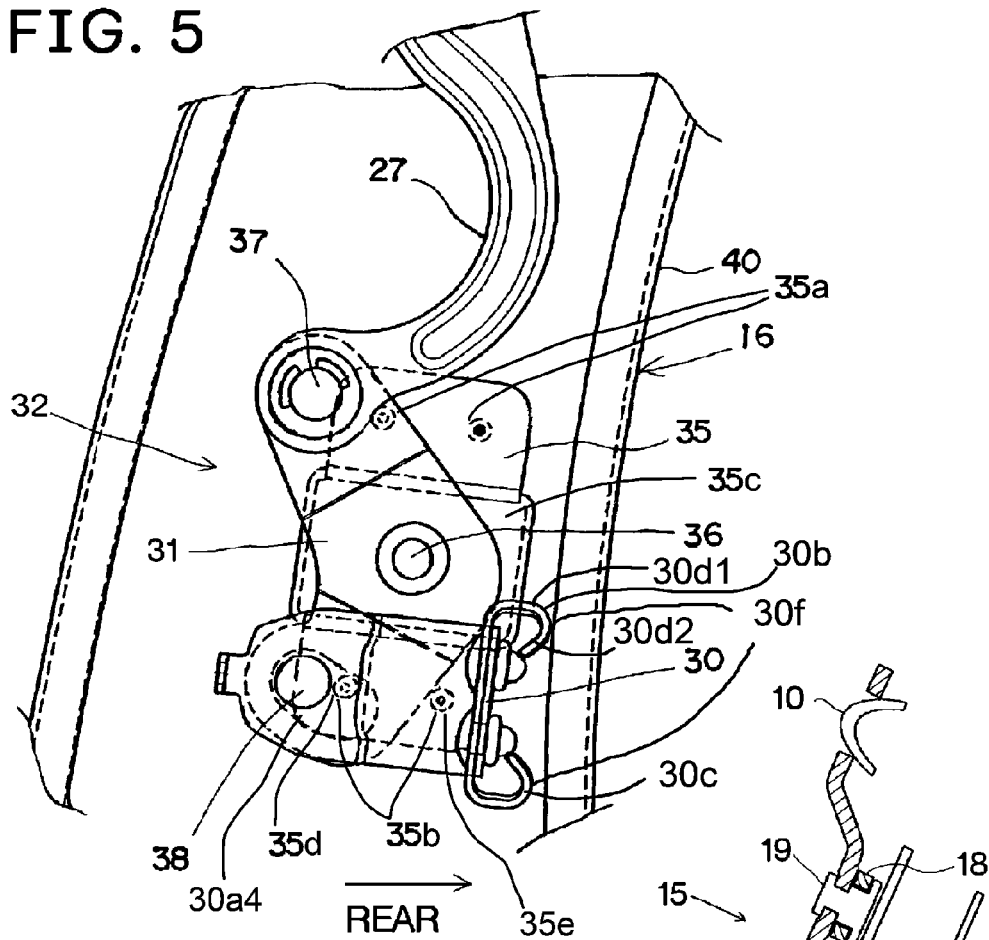
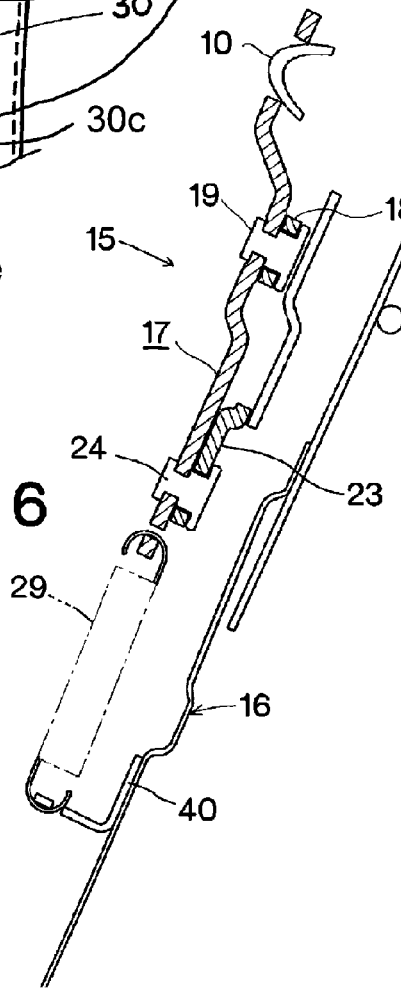

US 8,240,757 B2

COUPLING MECHANISM FOR HEADREST OF VEHICLE SEAT

CROSS-REFERENCE TO RELATED APPLICATIONS

This application is a divisional application of U.S. patent application Ser. No. 13/077,325, filed Mar. 31, 2011, which is a divisional application of U.S. patent application Ser. No. 12/279,766, filed Jun. 18, 2009, which is a PCT national stage entry of international patent application no. PCT/JP2005/13468, filed Jul. 22, 2005. The contents of these applications are herein incorporated by reference.

BACKGROUND

The present invention relates to a coupling mechanism for a headrest of a vehicle seat, and more particularly to a coupling mechanism for moving the headrest forward when a forward external force acts on a car body as a result of rear end collisions or the like.

Conventionally, there is known from Japanese Patent Application Laid-Open No. 10-119619 a vehicle seat having a headrest provided in a backrest, a movable member provided inside of the backrest, and a coupling mechanism for coupling the headrest and the movable member mechanically, in which, when a vehicle seat occupant moves backward relative to the vehicle seat due to rear collisions or the like, the movable member is pushed by the occupant to move backward, and the backward movement of the movable member moves the headrest forward by way of the coupling mechanism.

The coupling mechanism of the prior art is disposed substantially at the backside of a cushion of the backrest, and thus the cushion performance may be lowered. That is, the coupling mechanism is provided at a position overlapping the vehicle seat occupant in the front-to-back direction, and thus the cushion design is restricted.

The movable member in the prior art is narrow in its movable range, and the distance of moving the headrest forward is short, and means for compensating for lack of distance is difficult.

SUMMARY

It is hence an object of embodiments of the invention to provide a coupling mechanism for a headrest capable of amplifying the small moving amount of the movable member and transmitting the movement to the headrest. It is another object of embodiments of the invention to provide a coupling mechanism for a headrest capable of amplifying the moving amount of the movable member with a simple configuration. It is still another object of the invention to provide a coupling mechanism for a headrest not interfering with the cushion of the backrest substantially.

Therefore, a vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward in at least an end part in a vertical direction, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with first and second backward protrusions protruding backward, and the first and second backward protrusions extend laterally and are arranged in parallel with each other.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member, provided with a first backward protrusion protruding backward in an upper end part thereof, and provided with a second backward protrusion protruding backward in a lower end part thereof, and the first and second backward protrusions extend laterally.

BRIEF DESCRIPTION OF THE DRAWINGS

An embodiment of the invention is shown in the following figures.

FIG. 5 is a magnified side view of a lower link mechanism of the coupling mechanism;

FIG. 6 is a sectional view of a first link of the coupling mechanism;

DETAILED DESCRIPTION

Figure 1:
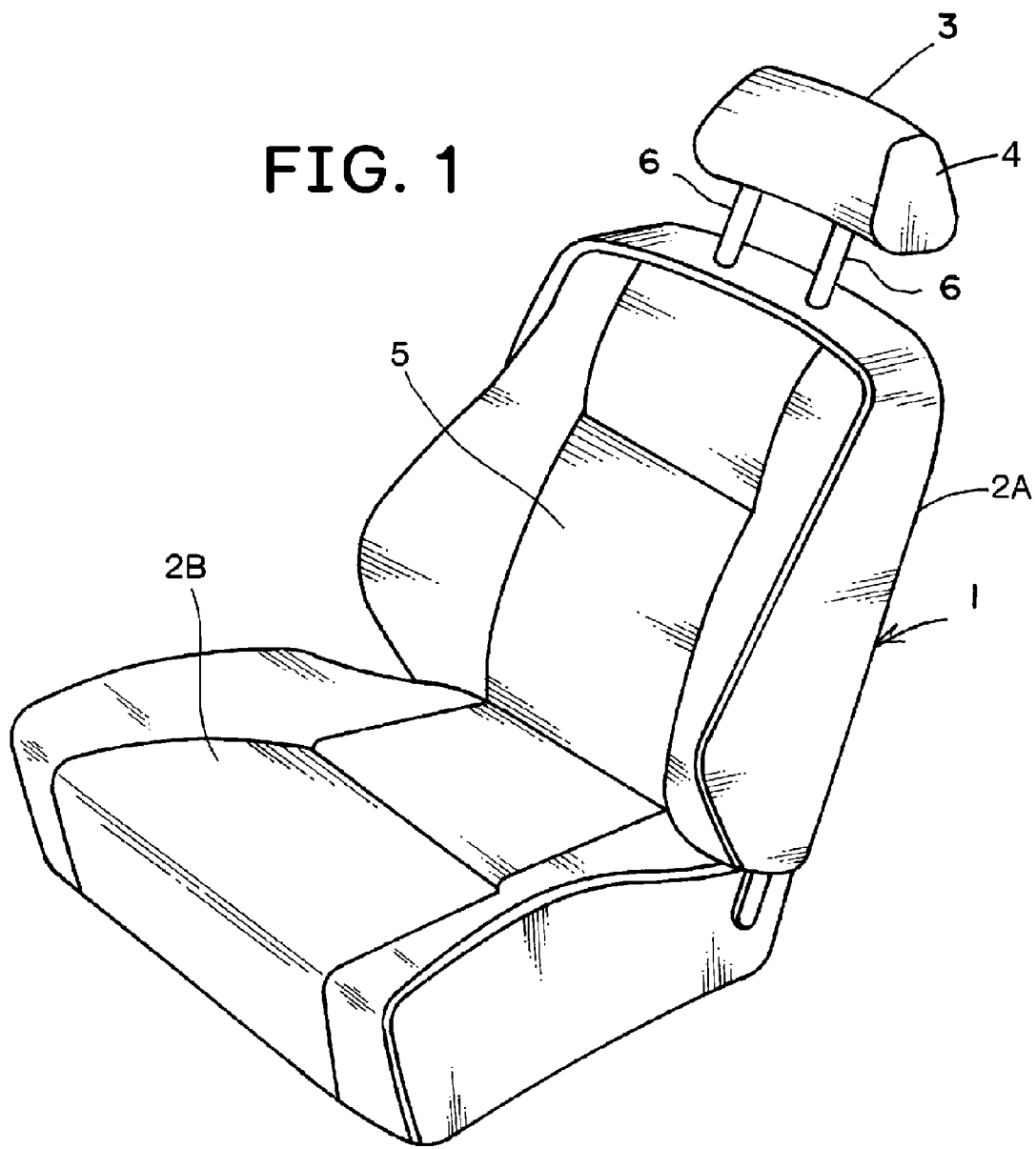
FIG. 1 is an overall perspective view of a vehicle seat.

An embodiment of the invention will be described with reference to the accompanying drawings. A vehicle seat 1 of the invention has a backrest 2A, a seat bottom 2B, and a headrest 3 having a head support 4 is provided in an upper part of the backrest 2A. A backrest frame 16 of the backrest 2A has a square frame shape, including a pair of side frames 40, each having an inward extension 40a and outwardly recessed portion 50, an upper frame 41, and a lower frame 42.

Near the upper frame 41, an upper movable member 10 (headrest support member) movable laterally to the backrest frame 16 is disposed. Vertical pillar supports 11 for inserting the lower parts of pillars 6 of the headrest 3 are fixed in the movable member 10. The pillars 6 are supported by the pillar supports 11 to be adjustable in height. The movable member 10 also has an outward extension 12a, and a forward extension 12b, as well as a protrusion 14 having an anteroposterior extension, and a forward bent portion 14a.

Figure 2:
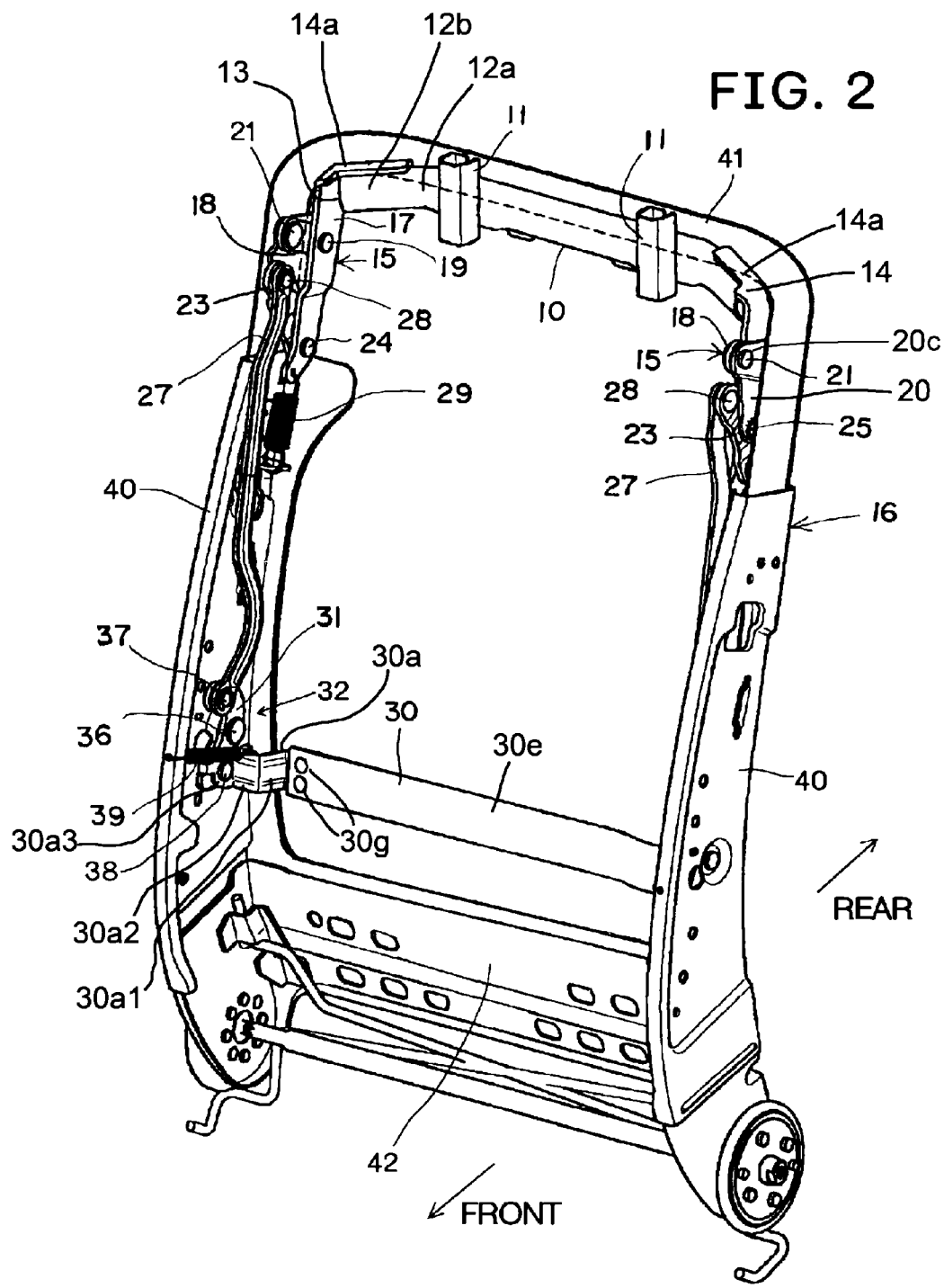
FIG. 2 is a perspective view showing a backrest frame and a part of a coupling mechanism for a headrest.
Figure 3:
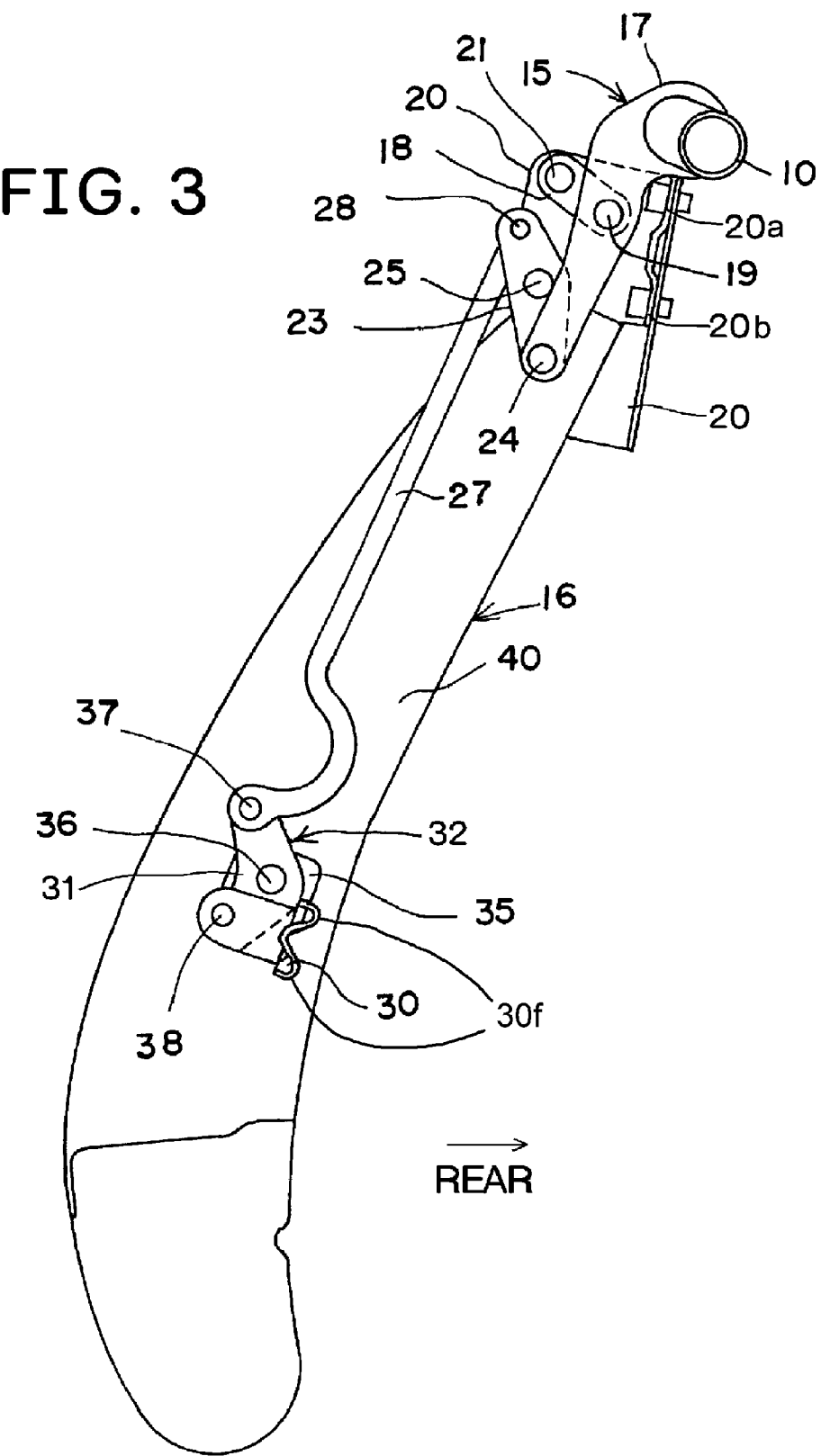
FIG. 3 is a side view of the coupling mechanism for a headrest.
Figure 4:
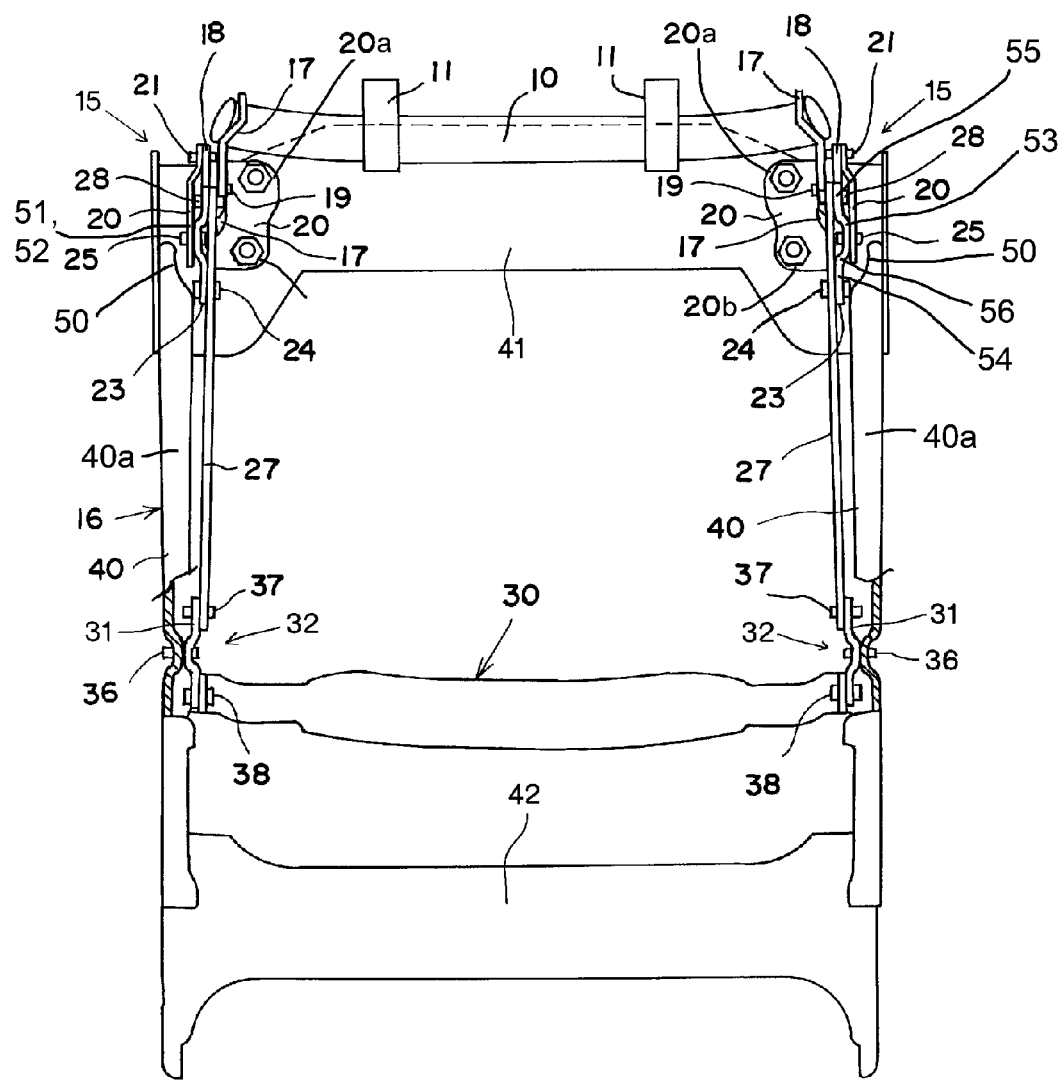
FIG. 4 is a front view of the backrest frame and the coupling mechanism for a headrest.
Figure 7:
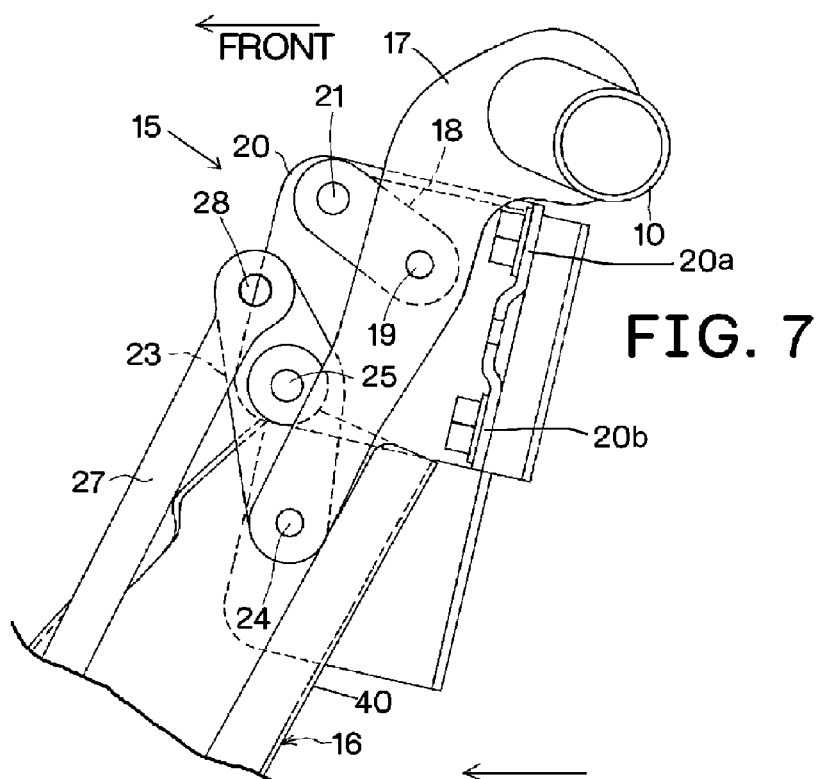
FIG. 7 is a magnified side view of an upper link mechanism of the coupling mechanism.

Both right and left sides of the upper movable member 10 are attached to the backrest frame 16 by way of an individual upper link mechanism 15. Each upper link mechanism 15 has a long first link 17 (downward extension, lateral portion of headrest support member), an arm 18 (second link member), and a second link 23 (first link member) as shown in FIGS. 2, 3 and 7. The end part of the upper movable member 10 is fixed to an upper part of the first link 17, and the arm 18 is rotatably pivoted on an L-shaped bracket 20 (or a bracket, bracket member, or upper bracket), having upper 20a and lower 20b fixing portions, fixed in the upper part of the backrest frame 16 by way of a shaft 21 (second link support shaft), and having a link support portion 20c. An intersection 13 exists between the first link 17 and the forward extension 12b. The second link 23 is rotatably pivoted on the bracket 20 by way of a shaft 25 (first link support shaft). The leading end of the arm 18 is pivoted on the vertical intermediate position of the first link 17 by way of a shaft 19 (second coupling shaft), and the leading end of the second link 23 is pivoted on the lower part of the first link 17 by way of a shaft 24 (first coupling shaft). The other end of the second link 23 is pivoted on the upper part of a long coupling rod 27 (transmission member) by way of a shaft 28. The bracket 20 has a link support portion 51 with a link support surface 52. The second link 23 has a bracket attachment 53, a first extension 54 and a second extension 55. The second link 23 also has a bent portion 56.

The first link 17, the arm 18 and the second link 23 of the upper link mechanism 15 are preliminarily assembled in, preferably, the bracket 20. As a result, the bracket provided with the link mechanism can be easily assembled in the backrest frame 16 as a unit module. The bracket provided with the link mechanism makes it easy to manage storage parts, and to replace parts in maintenance operations.

As shown in FIGS. 2 and 6, one end of an upper spring 29 is coupled to the lower part of the first link 17, and the other end of the upper spring 29 is coupled to the side frame 40. The first link 17 is usually held at a lower waiting position in FIG. 7 by an elastic force of the spring 29, and hence the headrest 3 is held at an ordinary position. When the first link 17 moves up to a position indicated by solid line in FIG. 8, the upper movable member 10 moves forward, and the headrest 3 is forced out forward.

Between the side frames 40, 40, a lower movable member 30, which may be a back-and-forth movable body or a sensing member, stretching laterally is disposed. The lower movable member 30 is pushed by a vehicle seat occupant and moved backward when the vehicle seat relatively moves forward of the occupant due to a rear end collision. Both sides of the lower movable member 30 are coupled to the ends of the lower link 31 (link member) of the lower link mechanism 32 by way of shafts 38 (coupling shafts). The lower movable member 30 comprises a plate-shaped portion 30e that connects to the shaft 38 via a coupling plate member 30a (also called a coupling member or end extension) through a first (or forward) extension 30a1, second (or outward) extension 30a2, and third (or anteroposterior) extension 30a3. The forward extension 30a1 comprises an elongated hole 30a4. The lower movable member 30 also comprises a shaft member 30g. The other end of the lower link 31 is coupled to the lower part of the coupling rod 27 (transmission member) by way of a shaft 37. The lower link 31 is preferably a bell crank. The center of the lower link 31 is pivoted on a lower bracket 35 (bracket member), having upper (or first) 35a and lower (or second) 35b fixing portions, fixed to the side frame 40 by way of a shaft 36 (link support shaft). The bracket member may also have an inward protruding surface 35c, a front fixing portion (or first attachment portion) 35d, and a rear fixing portion (or second attachment portion) 35e.

As shown in FIG. 2, one end of the lower spring 39 is coupled to the lower movable member 30, and the other end of the lower spring 39 is coupled to the side frame 40. The lower movable member 30 is held at a forward ordinary position by the elastic force of the spring 39, and when a rear end collision occurs, it is pushed by the vehicle seat occupant and moved backward by resisting the elastic force of the spring 39.

Figure 8:
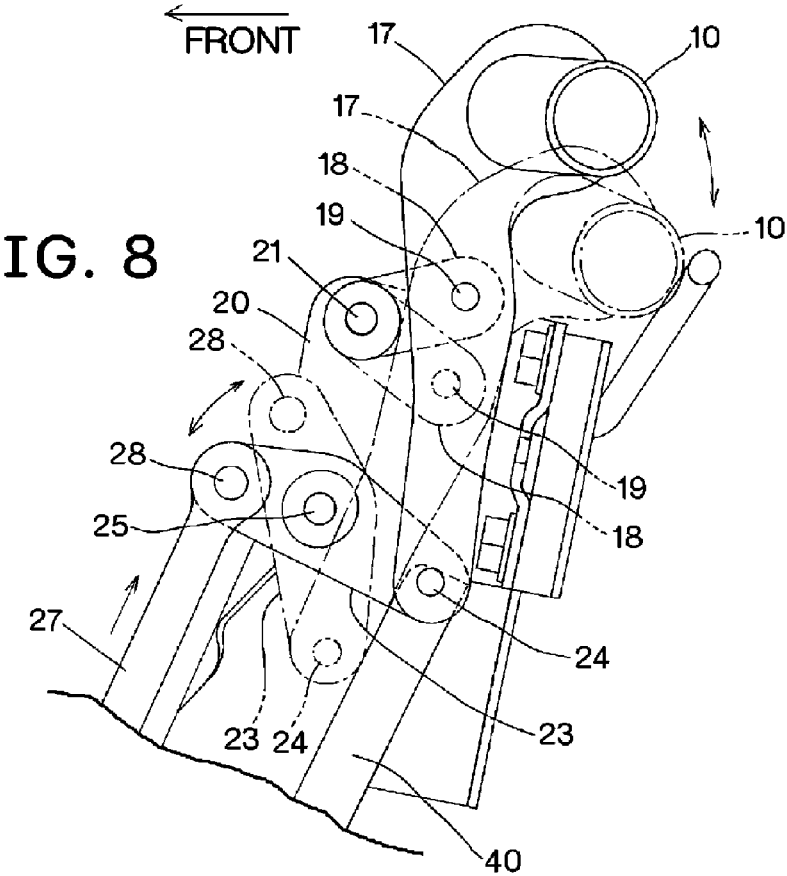
FIG. 8 is a magnified side view showing the first link elevated from the state in FIG. 7.

In FIGS. 3 and 5, the backward movement of the lower movable member 30 causes the lower link 31 to rotate counterclockwise about the shaft 36, and causes the coupling rod 27 to be pulled downward. As a result, the second link 23 rotates counterclockwise about the shaft 25, and moves the first link 17 upward by resisting the elastic force of the upper spring 29. At this time, the distance between the shaft 25 and shaft 28 is shorter than the distance between the shaft 25 and shaft 24. Thus, the second link 23 amplifies the moving amount of the coupling rod 27 (lower movable member 30) to transmit the movement to the first link 17, the upper part of the first link 17 is guided by the arm 18 and moved substantially forward as shown in FIG. 8, and thereby the headrest 3 is moved forward by way of the upper movable member 10 so that a cervical spine of the vehicle seat occupant is protected in the event of a rear end collision.

Thus, the upper link mechanism 15 of this embodiment of the invention has a function of moving the headrest 3 largely forward with a small moving amount of the lower movable member 30. The lower movable member 30 comprises backward protrusions 30f. The backward protrusions 30f may comprise a first backward protrusion 30b (upper backward protrusion) and a second backward protrusion 30c (lower backward protrusion). These each may comprise a first bent portion 30d1 and a second bent portion 30d2.

The side frame 40 of the backrest frame 16 is formed of a metal plate having a specified width in the front-to-back direction, and the upper link mechanism 15, coupling rod 27, and lower link 31 are disposed adjacent to the side frame 40. In addition, the members of the upper link mechanism 15 and the lower link 31 are formed of plates substantially parallel to the side frame 40, and are supported by the shaft in the lateral direction. The upper movable member 10 substantially overlaps with the upper frame 41 of the backrest frame 16. Therefore, the mechanism for transmitting the movement of the lower movable member 30 to the headrest 3 does not substantially interfere with the cushion 5 of the backrest 2A. Hence, the transmission mechanism is operated smoothly, and decline of performance of the cushion 5 is prevented.

| TABLE OF REFERENCE CHARACTERS | |
|---|---|
| 1 | vehicle seat |
| 2A | backrest |
| 2B | seat bottom |
| 3 | headrest |
| 4 | head support |

-continued

TABLE OF REFERENCE CHARACTERS

| | |
|---|---|
| 5 | cushion |
| 6 | pillars |
| 10 | upper movable member; headrest support member |
| 11 | pillar supports |
| 12a | outward extension |
| 12b | forward extension |
| 13 | intersection |
| 14 | protrusion |
| 14a | anteroposterior extension; forward bent portion |
| 15 | upper link mechanism |
| 16 | backrest frame |
| 17 | long first link; downward extension; lateral portion of headrest support member |
| 18 | arm; second link member |
| 19 | shaft; second coupling shaft |
| 20 | L-shaped bracket; bracket; bracket member; upper bracket |
| 20a, b | upper and lower fixing portions of bracket member |
| 20c | bracket member link support portion |
| 21 | shaft; second link support shaft |
| 23 | second link; first link member |
| 24 | shaft; first coupling shaft |
| 25 | shaft; first link support shaft |
| 27 | long coupling rod; transmission member |
| 28 | shaft |
| 29 | upper spring |
| 30 | lower movable member; back-and-forth movable body; sensing member |
| 30a | coupling plate member; coupling member; end extension |
| 30a1 | first extension; forward extension |
| 30a2 | second extension; outward extension |
| 30a3 | third extension; anteroposterior extension |
| 30a4 | forward extension elongated hole |
| 30b | first backward protrusion; upper backward protrusion |
| 30c | second backward protrusion; lower backward protrusion |
| 30d1 | first bent portion |
| 30d2 | second bent portion |
| 30e | plate shaped portion |
| 30f | backward protrusion |
| 30g | shaft member |
| 31 | lower link; bell crank; link member |
| 32 | lower link mechanism |
| 35 | lower bracket; bracket member |
| 35a | upper fixing portion of bracket member; first fixing portion of bracket member |
| 35b | lower fixing portion of bracket member; second fixing portion of bracket member |
| 35c | inward protruding surface of bracket member |
| 35d | front fixing portion of bracket member; first attachment portion of bracket member |
| 35e | rear fixing portion of bracket member; second attachment portion of bracket member |
| 36 | shaft; link support shaft |
| 37 | shaft |
| 38 | shaft; coupling shaft |
| 39 | spring |
| 40 | side frame |
| 40a | inward extension |
| 41 | upper frame |
| 42 | lower frame |
| 50 | outwardly recessed portion |
| 51 | link support portion |
| 52 | link support surface |
| 53 | bracket attachment |
| 54 | first extension |
| 55 | second extension |
| 56 | bent portion |

What is claimed is:

1. A vehicle seat comprising:
a backrest frame;
a headrest for supporting a head of a seat occupant;
a headrest support member laterally extending and movably attached to the backrest frame to support the headrest;
a link member that attaches the headrest support member to the backrest frame; and
a bracket member that is attached to the backrest frame;
wherein:
the headrest support member includes a lateral portion on each lateral side;
a lower end portion of the lateral portion is attached to the link member via a coupling shaft;
the link member is attached to the bracket member via a link support shaft;
the bracket member includes an upper fixing portion and a lower fixing portion and is fixed to the backrest frame via the upper and lower fixing portions;
the upper fixing portion of the bracket member is disposed below an upper end of the lateral portion of the headrest support member; and
the lower fixing portion of the bracket member is disposed above a lower end of the lateral portion of the headrest support member.

2. The vehicle seat according to claim 1, wherein the lower fixing portion is disposed above the coupling shaft.

3. The vehicle seat according to claim 1, wherein:
the bracket member is provided with a link support portion that supports the link support shaft; and
an upper end of the bracket member extends forward from the link support portion and is disposed anterior to the backrest frame in a horizontal plane passing through the link support shaft.

4. The vehicle seat according to claim 1, wherein the lower fixing portion is disposed posterior to a front end of the lateral portion of the headrest support member.

5. The vehicle seat according to claim 1, wherein at least a part of the lower fixing portion is disposed above the coupling shaft and below the link support shaft.

6. The vehicle seat according to claim 1, wherein at least a part of the lateral portion of the headrest support member and the bracket member are disposed in an overlapped manner with each other in a right-to-left direction.

7. A vehicle seat comprising:
a backrest frame;
a headrest for supporting a head of a seat occupant;
a headrest support member laterally extending and movably attached to the backrest frame to support the headrest;
a link member that attaches the headrest support member to the backrest frame; and
a bracket member that is attached to the backrest frame;
wherein:
the headrest support member includes a lateral portion that comprises a plate-shaped member on each lateral side;
the plate-shaped lateral portion is attached to the link member via a coupling shaft;
the link member is attached to the bracket member via a link support shaft;
the bracket member includes an upper fixing portion and a lower fixing portion and is fixed to the backrest frame via the upper and lower fixing portions;
the upper fixing portion of the bracket member is disposed below an upper end of the plate-shaped lateral portion of the headrest support member; and
the lower fixing portion of the bracket member is disposed above a lower end of the plate-shaped lateral portion of the headrest support member.

8. The vehicle seat according to claim 7, wherein the lower fixing portion is disposed above the coupling shaft.

9. The vehicle seat according to claim 7, wherein:
the bracket member is provided with a link support portion that supports the link support shaft; and an upper end of the bracket member extends forward from the link support portion and is disposed anterior to the backrest frame in a horizontal plane passing through the link support shaft.

10. The vehicle seat according to claim 7, wherein the lower fixing portion is disposed posterior to a front end of the plate-shaped lateral portion of the headrest support member.

11. The vehicle seat according to claim 7, wherein at least a part of the lower fixing portion is disposed above the coupling shaft and below the link support shaft.

12. The vehicle seat according to claim 7, wherein at least a part of the plate-shaped lateral portion of the headrest support member and the bracket member are disposed in an overlapped manner with each other in a right-to-left direction.

13. The vehicle seat according to claim 7, wherein:
a lower end portion of the plate-shaped lateral portion of the headrest support member is provided with a bearing hole that supports the coupling shaft; and
the bearing hole is disposed below a lower end surface of a laterally central part of the headrest support member.

14. A vehicle seat comprising:
a backrest frame;
a headrest for supporting a head of a seat occupant;
a headrest support member laterally extending and movably attached to the backrest frame to support the headrest;
a link member that attaches the headrest support member to the backrest frame; and
a bracket member that is attached to the backrest frame; wherein:
the headrest support member is provided with a downward extension extending downward on each lateral side;
the downward extension is attached to the link member via a coupling shaft;
the link member is attached to the bracket member via a link support shaft;
the bracket member includes an upper fixing portion and a lower fixing portion and is fixed to the backrest frame via the upper and lower fixing portions;
the upper fixing portion of the bracket member is disposed below an upper end of the downward extension; and
the lower fixing portion of the bracket member is disposed above a lower end of the downward extension.

15. The vehicle seat according to claim 14, wherein the lower fixing portion is disposed above the coupling shaft.

16. The vehicle seat according to claim 14, wherein:
the bracket member is provided with a link support portion that supports the link support shaft; and
an upper end of the bracket member extends forward from the link support portion and is disposed anterior to the backrest frame in a horizontal plane passing through the link support shaft.

17. The vehicle seat according to claim 14, wherein:
the downward extension comprises a plate-shaped member; and
the lower fixing portion is disposed posterior to a front end of the plate-shaped downward extension.

18. The vehicle seat according to claim 14, wherein at least a part of the lower fixing portion is disposed above the coupling shaft and below the link support shaft.

19. The vehicle seat according to claim 14, wherein:
the downward extension comprises a plate-shaped member; and
at least a part of the plate-shaped downward extension and the bracket member are disposed in an overlapped manner with each other in a right-to-left direction.

20. The vehicle seat according to claim 14, wherein:
the downward extension comprises a plate-shaped member; and
the coupling shaft is disposed below a lower end surface of a laterally central part of the headrest support member and above a lower end of the plate-shaped downward extension.

* * * * *